(12) United States Patent
Zeng et al.

(10) Patent No.: US 10,778,713 B2
(45) Date of Patent: Sep. 15, 2020

(54) METHOD AND SYSTEM TO MANAGE RISK OF VULNERABILITIES AND CORRESPONDING CHANGE ACTIONS TO ADDRESS MALWARE THREATS

(71) Applicant: International Business Machines Corporation, Armonk, NY (US)

(72) Inventors: Sai Zeng, Yorktown Heights, NY (US); Vugranam C. Sreedhar, Yorktown Heights, NY (US); Karin Murthy, Elmsford, NY (US); Jinho Hwang, Ossining, NY (US); Milton H. Hernandez, Tenafly, NJ (US); Lisa M. Chavez, Placitas, NM (US); Muhammed Fatih Bulut, New York, NY (US); Virginia Mayo, Piscataway, NJ (US); Xinli Wang, Yorktown Heights, NY (US); Cindy Mullen, Madison, WI (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 273 days.

(21) Appl. No.: 15/904,529

(22) Filed: Feb. 26, 2018

(65) Prior Publication Data
US 2019/0268366 A1    Aug. 29, 2019

(51) Int. Cl.
*H04L 29/06* (2006.01)
*G06N 3/04* (2006.01)
*G06N 3/08* (2006.01)

(52) U.S. Cl.
CPC ....... *H04L 63/1433* (2013.01); *G06N 3/0472* (2013.01); *G06N 3/08* (2013.01)

(58) Field of Classification Search
CPC . H04L 63/14; H04L 63/1408; H04L 63/1433; H04L 63/1441; H04L 63/145; G06N 3/0472; G06N 3/08; G06Q 10/0635
See application file for complete search history.

(56) References Cited

U.S. PATENT DOCUMENTS 7,647,637 B2    1/2010    Schuba et al.
8,195,525 B2    6/2012    Emerick et al.
(Continued)

FOREIGN PATENT DOCUMENTS

WO    2015105486 A1    7/2015

OTHER PUBLICATIONS cvedetials.com, "Security Vulnerabilities Related to CWE-20," Retrieved: Nov. 29, 2017, 3 pages.
cew.mitre.org, "Common Weakness Enumeration," Retrieved: Nov. 29, 2017, 8 pages.
McQueen, et al., "Quantitative Cyber Risk Reduction Estimation Methodology for a Small SCADA Control System," Hawaii International Conference on System Science, Jan. 2006, 12 pages.
(Continued)

*Primary Examiner* — Malcolm Cribbs
(74) *Attorney, Agent, or Firm* — Amin, Turocy & Watson, LLP

(57) ABSTRACT

A system includes a memory that stores computer executable components and neural network data, and a processor executes computer executable components stored in the memory. An assessment component assesses a computer network, and classifies the computer network relative to M network classifications stored in a repository, wherein M is an integer greater than one. A risk component determines risk of vulnerability subject to change impact regarding protection against a computer virus or cyber-attack based on historical information regarding vulnerability exposure and vulnerability remediation changes relative to the classification of the computer network. A recommendation component that generates recommendations and best action to mitigate risk and impact, and remediate the vulnerabilities based on the risk assessment and business priorities.

23 Claims, 10 Drawing Sheets

(56) References Cited

U.S. PATENT DOCUMENTS

| | | | |
|---|---|---|---|
| 8,791,681 B2 | 7/2014 | Ayachitula et al. | |
| 9,407,656 B1* | 8/2016 | Roehl | H04L 63/1433 |
| 9,729,564 B2 | 8/2017 | Hutton | |
| 2003/0154269 A1* | 8/2003 | Nyanchama | H04L 63/1433 709/223 |
| 2005/0066019 A1 | 3/2005 | Egan et al. | |
| 2006/0191012 A1* | 8/2006 | Banzhof | G06F 21/577 726/25 |
| 2007/0300215 A1 | 12/2007 | Bardsley | |
| 2013/0006701 A1 | 1/2013 | Guven et al. | |
| 2017/0237760 A1* | 8/2017 | Holeman | G06F 9/45558 726/22 |
| 2017/0270304 A1* | 9/2017 | Li | G06F 21/554 |
| 2018/0205755 A1* | 7/2018 | Kavi | G06F 16/11 |

OTHER PUBLICATIONS symantec.com, "Microsoft Windows SMB Server CVE-2017-0144 Remote Code Execution Vulnerability," Retrieved: Nov. 29, 2017, 4 pages.

symantec.com, "Microsoft Windows SMB Server CVE-2017-0145 Remote Code Execution Vulnerability," Retrieved: Nov. 29, 2017, 4 pages.

Poolsappasit, et al., "Dynamic Security Risk Management Using Bayesian Attack Graphs," IEEE Transaction on Dependable and Secure Computing, vol. 9, No. 1, Jan.-Feb. 2012, 14 pages.

Ng, "WannaCry ransomware loses its kill switch, so watch out," May 15, 2017, 2 pages.

malwareless.com, "WannaCry ransomware massively attacks computer systems allover the world," May 12, 2017, 16 pages.

\* cited by examiner

Version 2 (V3 is also available)

Access Vector

The access vector (AV) shows how a vulnerability may be exploited.

| Value | Description | Score |
|---|---|---|
| Local (L) | The attacker must either have physical access to the vulnerable system (e.g. firewire attacks) or a local account (e.g. a privilege escalation attack). | 0.395 |
| Adjacent Network (A) | The attacker must have access to the broadcast or collision domain of the vulnerable system (e.g. ARP spoofing, bluetooth attacks). | 0.646 |
| Network (N) | The vulnerable interface is working at layer 3 or above of the OSI Network stack. These types of vulnerabilities are often described as remotely exploitable (e.g. a remote buffer overflow in a network service) | 1.0 |

— 402

Access Complexity

The access complexity (AC) metric describes how easy or difficult it is to exploit the discovered vulnerability.

| Value | Description | Score |
|---|---|---|
| High (H) | Specialized conditions exist, such as a race condition with a narrow window, or a requirement for social engineering methods that would be readily noticed by knowledgeable people. | 0.35 |
| Medium (M) | There are some additional requirements for access, such as a limit on the origin of the attacks, or a requirement for the vulnerable system to be running with an uncommon, non-default configuration. | 0.61 |
| Low (L) | There are no special conditions for access to the vulnerability, such as when the system is available to large numbers of users, or the vulnerable configuration is ubiquitous. | 0.71 |

— 404

Authentication

The authentication (Au) metric describes the number of times that an attacker must authenticate to a target to exploit it. It does not include (for example) authentication to a network in order to gain access. For locally exploitable vulnerabilities, this value should only be set to Single or Multiple if further authentication is required after initial access.

| Value | Description | Score |
|---|---|---|
| Multiple (M) | Exploitation of the vulnerability requires that the attacker authenticate two or more times, even if the same credentials are used each time. | 0.45 |
| Single (S) | The attacker must authenticate once in order to exploit the vulnerability. | 0.56 |
| None (N) | There is no requirement for the attacker to authenticate. | 0.704 |

Impact metrics

Confidentiality

The confidentiality (C) metric describes the impact on the confidentiality of data processed by the system.

| Value | Description | Score |
|---|---|---|
| None (N) | There is no impact on the confidentiality of the system. | 0.0 |
| Partial (P) | There is considerable disclosure of information, but the scope of the loss is constrained such that not all of the data is available. | 0.275 |
| Complete (C) | There is total information disclosure, providing access to any / all data on the system. Alternatively, access to only some restricted information is obtained, but the disclosed information presents a direct, serious impact. | 0.660 |

— 502

Integrity

The Integrity (I) metric describes the impact on the integrity of the exploited system.

| Value | Description | Score |
|---|---|---|
| None (N) | There is no impact on the integrity of the system. | 0.0 |
| Partial (P) | Modification of some data or system files is possible, but the scope of the modification is limited. | 0.275 |
| Complete (C) | There is total loss of integrity; the attacker can modify any files or information on the target system. | 0.660 |

— 504

Availability

The availability (A) metric describes the impact on the availability of the target system. Attacks that consume network bandwidth, processor cycles, memory or any other resources affect the availability of a system.

| Value | Description | Score |
|---|---|---|
| None (N) | There is no impact on the availability of the system. | 0.0 |
| Partial (P) | There is reduced performance or loss of some functionality | 0.275 |
| Complete (C) | There is total loss of availability of the attacked resource. | 0.660 |

— 506

CVSS v2.0 Ratings — 508 — CVSS v3.0 Ratings

| Severity | Base Score Range |
|---|---|
| Low | 0.0-3.9 |
| Medium | 4.0-6.9 |
| High | 7.0-10.0 |

| Severity | Base Score Range |
|---|---|
| None | 0.0 |
| Low | 0.1-3.9 |
| Medium | 4.0-6.9 |
| High | 7.0-8.9 |
| Critical | 9.0-10.0 |

FIG. 5

Node and Application Vulnerability Assessment – CVE 2017-0144

- 602 — CVSS Score: 9.3
- 604 — Confidentiality Impact: Complete (There is total information disclosure, resulting in all system files being revealed.)
- 606 — Integrity Impact: Complete (There is a total compromise of system integrity. There is a complete loss of system protection, resulting in the entire system being compromised.)
- 608 — Availability Impact: Complete (There is a total shutdown of the affected resource. The attacker can render the resource completely unavailable.)
- 610 — Access Complexity: Medium (The access conditions are somewhat specialized. Some preconditions must be satisfied to exploit)
- 612 — Authentication: Not required (Authentication is not required to exploit the vulnerability.)
- 614 — Gained Access: None

FIG. 6

METHOD AND SYSTEM TO MANAGE RISK OF VULNERABILITIES AND CORRESPONDING CHANGE ACTIONS TO ADDRESS MALWARE THREATS

TECHNICAL FIELD

The subject disclosure relates generally to a systematic process that addresses vulnerability from various malware worms in an IT environment by utilizing historical tracking of attack patterns, risk vulnerability factors and in-depth change control risk assessments to provide optimum recommendations to mitigate potential negative impact.

SUMMARY

The following presents a summary to provide a basic understanding of one or more embodiments of the innovation. This summary is not intended to identify key or critical elements, delineate scope of the particular embodiments or scope of the claims. Its sole purpose is to present concepts in a simplified form as a prelude to the more detailed description that is presented later. In one or more embodiments described herein, systems, computer-implemented methods, apparatus and/or computer program products that facilitate the production of a final product using neural networks in a context are described.

The subject innovation introduces a method and system to manage risk vulnerabilities in an IT framework and provide tangible clear recommendations to the customer to prevent or minimize the damage cyberattacks such as a virus or malware may cause. This subject innovation provides a systematic methodology that can be utilized by any organization to assess and make significant informative decisions about potential IT threats that could impact the health of its network (network can be considered as an entirety of all elements of a network infrastructure) and possibly the entire business.

This methodology is based on multiple variables that play a role in mathematical calculations and historical data that serve as a foundation to recommendations provided to a customer. These variables are composed of factors such as analyzing past historical data on similar cyber attack patterns, past performance and impact of systems after certain change controls, and identifying risk vulnerabilities based on standard industry numerical designations assigned to currently known risks along with other factors. Unlike current state of the art, risk and impact assessment based on historical information is utilized for both perspectives: vulnerability exposure and vulnerability remediation change.

Mathematical models such as a Bayesian network, a neural network, hidden Markov model (HMM) or a support vector machine model can provide predictive analysis of vulnerabilities and change actions to reduce impact. Based on the information this method gathers, it proceeds to recommend actions to mitigate the risk and impact to remediate vulnerabilities based on risk assessment and business priority. The innovation provides a novel way to evaluate likely risk and impacts on a target environment. The method also can provide an intelligent component to evaluate historic changes taken and provide risk assessment on intended changes. This innovation can drive proactive measures to reduce risk, vulnerability, impact, and occurrence frequency to better safe guard business IT environments.

According to an embodiment, a system, comprises a memory that stores computer executable components, and a processor that executes computer executable components stored in the memory. An assessment component assesses a computer network, and classifies the computer network relative to M network classifications stored in a repository, wherein M is an integer greater than one. A risk component determines risk of vulnerability subject to change impact regarding protecting against a computer virus or cyber-attack based on historical information regarding vulnerability exposure and vulnerability remediation changes relative to the classification of the computer network. A recommendation component generates recommendations and best action to mitigate risk and impact, and remediate the vulnerabilities based on the risk assessment and business priorities.

In accordance with yet another embodiment, a computer-implemented method, comprising employing a processor and memory to execute computer executable components to perform the following acts: assessing a computer network, and classifying the computer network relative to M network classifications stored in a repository, wherein M is an integer greater than one; determining risk of vulnerability subject to change impact regarding protection against a computer virus or cyber-attack based on historical information regarding vulnerability exposure and vulnerability remediation changes relative to the classification of the computer network; and generating recommendations and best action to mitigate risk and impact, and remediate the vulnerabilities based on the risk assessment and business priorities.

DESCRIPTION OF THE DRAWINGS

FIGS. 4 and 5 illustrate industry standard scoring criteria used when networks are analyzed for vulnerability and threat impact.

FIG. 6 illustrates an example evaluation of criteria levels and basic vulnerability score based on status of the levels.

DETAILED DESCRIPTION

Figure 1:
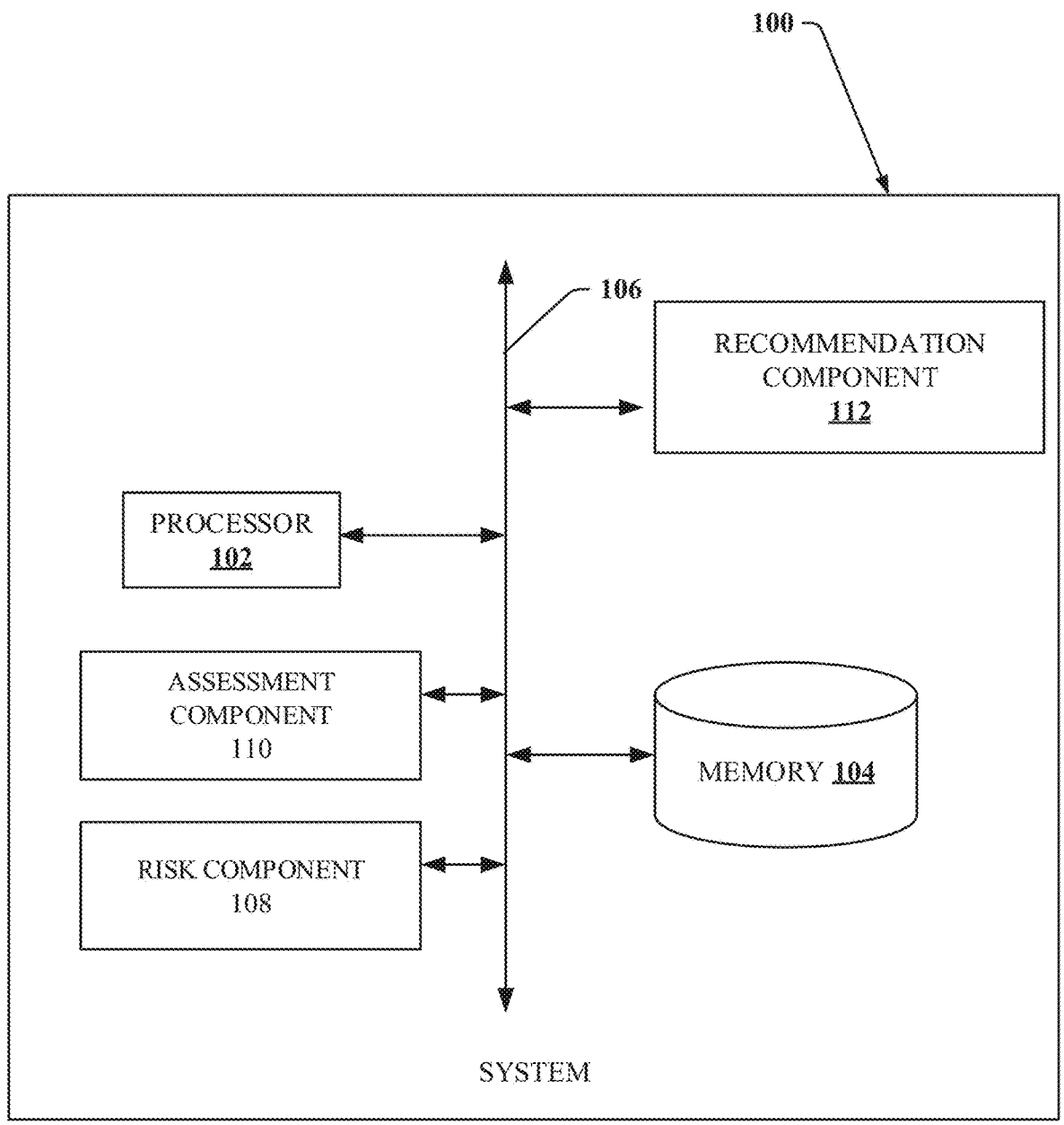
FIG. 1 illustrates a block diagram of an example system implemented that can assess computer networks, determine risk components and potential change impact to provide recommendations to mitigate threats.

The following detailed description is merely illustrative and is not intended to limit embodiments and/or application or uses of embodiments. Furthermore, there is no intention to be bound by any expressed or implied information presented in the preceding Summary section, or in the Detailed Description section. One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident; however, in various cases, that the one or more embodiments can be practiced without these specific details.

Ransomware is a type of malware that prevents or limits users from accessing a system, either by locking the system's screen or by locking a users' files unless ransom is paid. One type of malware was identified by name as "WannaCry" and it propagated a cyberattack in 2017 infecting PCs in countries and businesses around the world. The WannaCry threat was composed of two parts, a worm module and a ransomware module. The ransomware module was spread by a companion worm module. This malware worm locked people out of their computer systems and data unless ransom was paid to a perpetrator to provide a fix. In this case, Microsoft had provided a patch (corrective fix) to users several months prior to when the WannaCry worm was heavily noticed. This patch would have mitigated or possibly eliminated this ransomware threat. However, due to perceived complexity and risk, many organizations declined to pursue deploying the patch as instructed into their IT systems.

Concerns such as when should the patch be applied, difficulty in applying the patch, risk of a negative outcome implementing the patch to a currently running fragile system overwhelmed many IT organizations. This lack of preventive action led to the worm infiltrating multiple networks and then spreading to other networks worldwide. More modern ransomware families, collectively categorized as crypto-ransomware, encrypt certain file types on infected systems and forces users to pay the ransom through certain online payment methods to get a decrypt key.

Ransom prices vary depending on a ransomware variant and price or exchange rates of digital currencies. Due to perceived anonymity offered by cryptocurrencies, ransomware operators commonly specify ransom payments in bitcoins. Users may encounter this threat through a variety of means. Ransomware can be downloaded onto systems when unwitting users visit malicious or compromised websites. It can also arrive as a payload either dropped or downloaded by other malware. Some ransomware is known to be delivered as attachments from spammed email, downloaded from malicious pages through malvertisements, or dropped by exploit kits onto vulnerable systems. Once executed in the system, ransomware can either lock the computer screen, or, in the case of crypto-ransomware, encrypt predetermined files. In the first scenario, a full-screen image or notification is displayed on the infected system's screen, which prevents victims from using their system. A growing number of attacks have used remote desktop protocol and other approaches that don't rely on any form of user interaction. Early instances of these attacks sometimes merely "locked" access to the web browser or to the Windows desktop—and did so in ways that often could be fairly easily reverse-engineered and reopened, hackers have since created versions of ransomware that use strong, public-key encryption to deny access to files on the computer. Ransomware has some key characteristics that separates it from other malware. It features unbreakable encryption, which means that you can't decrypt the files on your own. It has the ability to encrypt all kinds of files, from documents to pictures, videos, audio files and other things you may have on your PC. It can scramble your file names, so you can't know which data was affected and it can add a different extension to your files, to sometimes signal a specific type of ransomware strain.

Ransomware can display an image or a message that lets one know his/her data has been encrypted and that one often needs to pay a specific sum of money to retrieve the hacked file. It requests payment in Bitcoins because this cryptocurrency are difficult to track by cyber security researchers or law enforcements agencies. Usually, the ransom payments have a time-limit, to add another level of intense constraint to such extortion scheme. Passing the time deadline typically means the ransom will increase, but it can also mean that the data will be destroyed and lost forever, which is a risk many organizations simply can't take. It uses a complex set of evasion techniques to go undetected by traditional antivirus and often recruits the infected PCs into botnets, so cyber criminals can expand their infrastructure and fuel future attacks. It can spread to other PCs connected to a local network, creating further damage and frequently features data exfiltration capabilities, which means that it can also extract data from the affected computer (usernames, passwords, email addresses, etc.) and send it to a server controlled by cyber criminals; encrypting files isn't always the endgame. It can sometimes include advanced geographical targeting, meaning the ransom note is translated into a victim's language, to increase the chances for the ransom to be paid. Based on potential devastating impact ransomware can have on an organization, it is paramount the IT environment is protected and insulated from these malware threats, and if infiltrated the damage is contained. To achieve this protective setting, the herein described innovation invention can factor into account significant variables to calculate and deduce most appropriate action.

FIG. 1 illustrates a block diagram of an example, non-limiting system 100 that can facilitate a process of assessing and identifying a large amount of network data, and using machine learning, training a neural network or other type of model to determine risk components, and generate predictive recommendations to remediate vulnerabilities and provide optimum results in a particular context in accordance with one or more embodiments described herein. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. Repetitive description of like elements employed in one or more embodiments described herein is omitted for sake of brevity.

System 100 can optionally include a server device, one or more networks and one or more devices (not shown). The system 100 can also include or otherwise be associated with at least one processor 102 that executes computer executable components stored in memory 104. The system 100 can further include a system bus 106 that can couple various components including, but not limited to, a risk component 108, an assessment component 110, and a recommendation component 112. The system 100 can be any suitable computing device or set of computing devices that can be communicatively coupled to devices, non-limiting examples of which can include, but are not limited to, a server computer, a computer, a mobile computer, a mainframe computer, an automated testing system, a network storage device, a communication device, a web server device, a network switching device, a network routing device, a gateway device, a network hub device, a network bridge device, a control system, or any other suitable computing device. A device can be any device that can communicate information with the system 100 and/or any other suitable device that can employ information provided by system 100. It is to be appreciated that system 100, components, models or devices can be equipped with communication components (not shown) that enable communication between the system, components, models, devices, etc. over one or more networks.

In accordance with the system 100, a memory 104 can store computer executable components executable by the processor 102. A risk component 108 can calculate risk of existing vulnerabilities and impact on potential action or non-action upon an existing network. An assessment component 110 can assess the network based on current or historical information from data repositories and classify it categorically into a specific type of network model. A recommendation component 112 can compile and process the data provided to generate recommendations that will mitigate risk and provide suitable results for an organization. In an implementation, the risk component 108 can include a predictive model that predicts risk of a change based on incident history. Any suitable predictive model can be employed such as for example: a logical regression model; a Bayesian network; a neural network; hidden Markov model (HMM); or a support vector machine (SVM). The incident history can include at least one of: category of change; owner group performing changes; similar changes; affected configuration items; or questionnaire answers indicating risk. The risk component 108 can identify one or more changes in the past that caused an incident. In an embodiment, the risk component 108 can identify the one or more changes in the past that caused the incident through structured documentation. In addition, or alternatively, the risk component can identify the one or more changes in the past that caused the incident through at least one of: scanning incident resolutions, problem records, or root cause analysis data for evidence of a change causing the incident.

The risk component 108 can identify the one or more changes in the past that caused the incident through probabilistic linkage of changes and incident based on the predictive model. The risk component 108 can also identify similar changes through classifying changes into pre-defined categories. In an implementation, a natural language classifier (NLC) can be employed in connection with the classification of changes into pre-define categories. In yet another implementation, the risk component 108 can identify similar changes through fine-grained similarity measures taking into account cosine-similarity of change request descriptions, configuration items affected, or change owner.

The various components (e.g. risk component 108, assessment component 110, and recommendation component 112, and/or other components) of system 100 can be connected either directly or via one or more networks. Such networks can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, or any other suitable communication technology. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

Further, some of the processes performed can be performed by specialized computers for carrying out defined tasks related to various types of neural networks in their particular context. The subject computer processing systems, methods apparatuses and/or computer program products can be employed to solve new problems that arise through advancements in technology, computer networks, the Internet and the like.

Embodiments of devices described herein can employ artificial intelligence (AI) to facilitate automating one or more features described herein. The components can employ various AI-based schemes for carrying out various embodiments/examples disclosed herein. To provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z1, z2, z3, z4, \ldots, zn)$, to a confidence that the input belongs to a class, as by $f(z)=\text{confidence}(\text{class})$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

Figure 2:
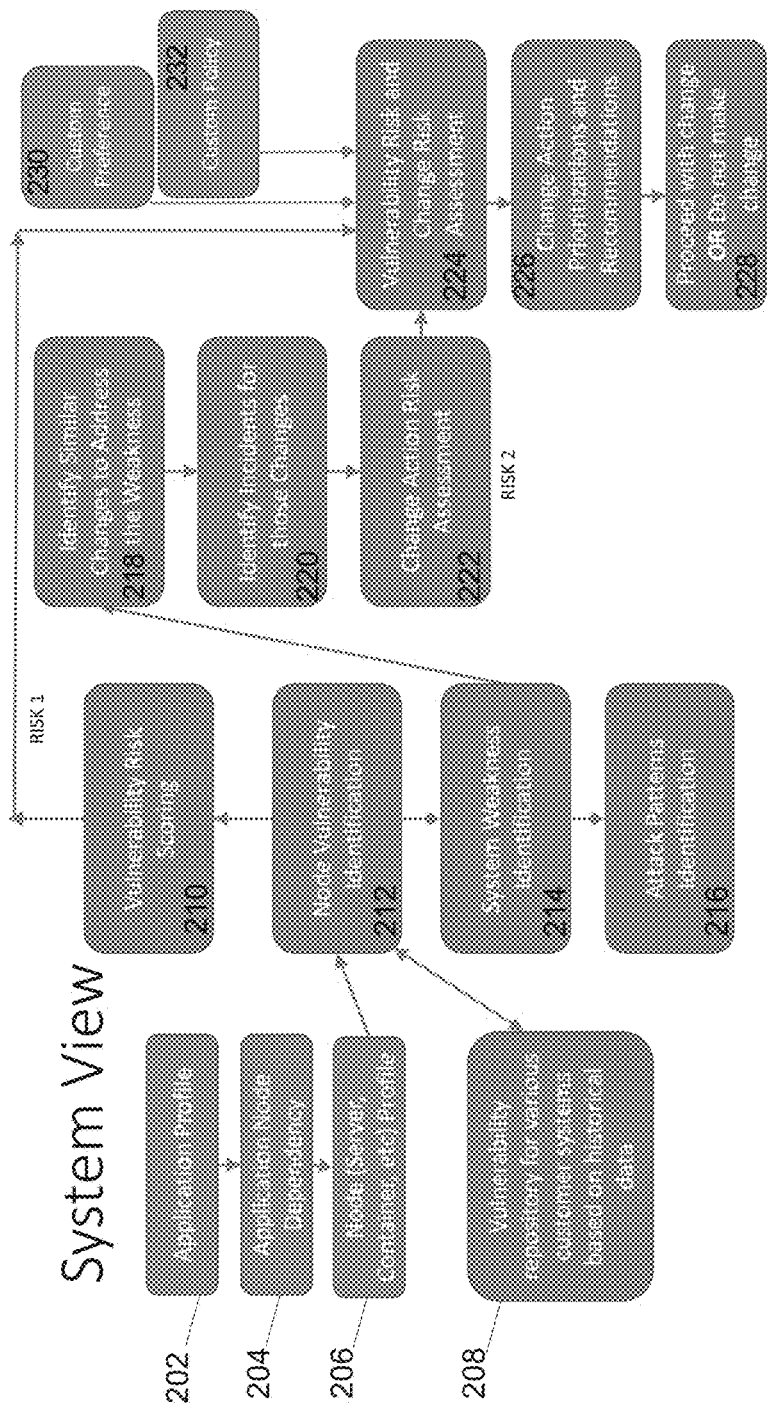
FIG. 2 illustrates a vulnerability assessment and remedial action process flowchart.

FIG. 2 illustrates a flowchart depicting vulnerability assessment and remedial action process in accordance with an embodiment. Tanned sections of 202-206 represent a network to be assessed. System 100 (FIG. 1) can assess application profile (or profiles) 202, application node dependencies 204, and profile of servers, nodes, container, etc.) 206. These parameters will be taken into account by the system 100 and can be utilized by any suitable model to assist in generating predictive results. The system 100 can also access standard vulnerability database 208 to supplement its input data for the process of model comparisons or any other related task. Based on this provided information, the system 100 identifies node vulnerabilities 212, system weaknesses 214 and attack patterns 216 based on current or historical data. The system 100 calculates vulnerability risk score 210 (CVSS, which is an industry standard (subject to change) that stands for Common Vulnerability Scoring System). The system 100 analyzes the network weakness it has compiled and identifies similar changes (from historical data) to address those weaknesses 218. The system 100 proceeds to identify incidents that have occurred for those changes 220 and activates a process to assess change action risk 222. This change action risk assessment includes identifying which changes in the past caused incidents through structured documentation (e.g., link records created manually in a ticketing system) or unstructured documentation. It can also be done through scanning incident resolutions, problem records, and root cause analysis data for evidence of a change causing an incident.

Through probabilistic linkage of changes and incident based on a predictive model learned from the other two approaches (might include a manual verification step). This process can also identify similar changes through classifying changes into pre-defined categories (e.g. using NLC). Additional methods such as through fine-grained similarity measures taking into account cosine-similarity of change request descriptions, configuration items affected, change owner, etc. can be used. The risk assessment also utilizes incident history related to but not exclusive to category of change, the owner group performing the change, the specific configuration parameters to be changed, and feedback from customers. Historical data is also used to track and document cases of incidents that occurred after standard monthly patch schedules were followed as directed but subsequently caused outages or other adverse impact. The method incorporates the change risk 222 along with the vulnerability risk 210 into 224 (a combination of the two), then marries the results with customer policy and preference (230, 232) to make a final recommendation 226. The final recommendation directs the customer to proceed or decline the intended change (228). This recommendation can be based on previous variable data and can suggest multiple options-such as make the change or avoid the change entirely. The recommendation may include additional selective options such as execute the change at a different window or other potential scenarios. It is to be appreciated that current vulnerability of the network can be assessed, e.g., prior to any change.

Figure 3:
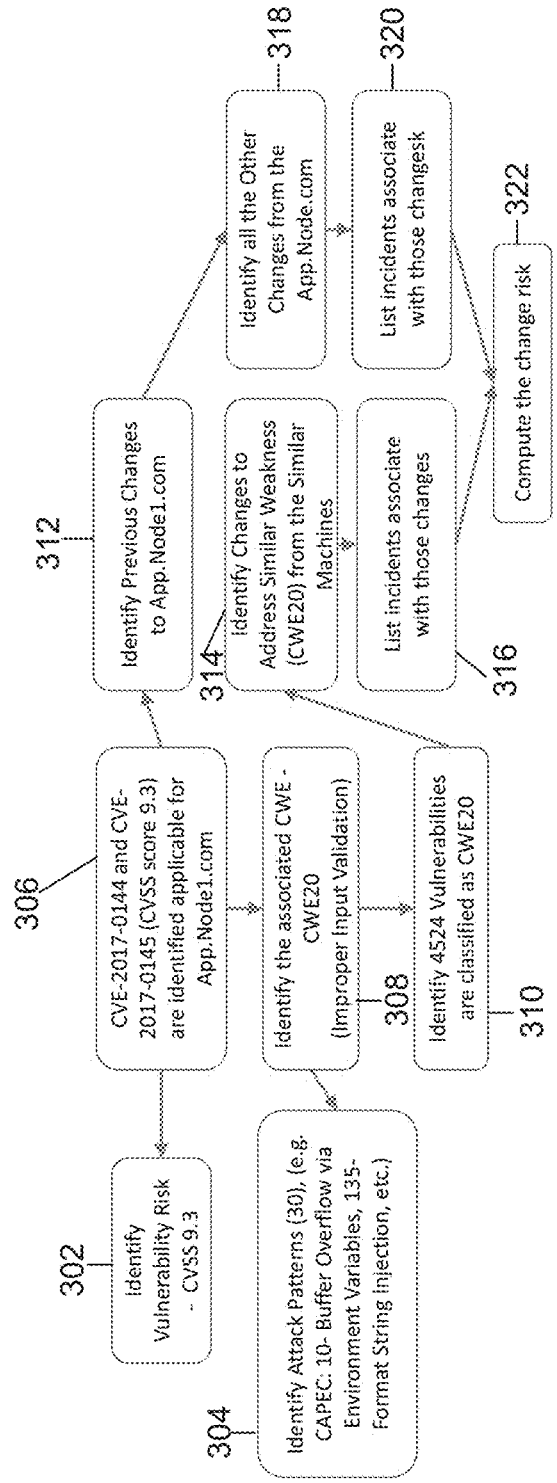
FIG. 3 illustrates an example implementation of a vulnerability assessment and remedial action process.

FIG. 3 illustrates an example implementation of the vulnerability and remedial action flowchart as described in FIG. 2. This is an example of the WannaCry threat and the method process to gather the significant data and factors required and then apply the best predictive response to neutralize the threat. Two vulnerabilities for application node 1 are identified as CVE-2017-0144 and CVE-2017-0145 (306). CVE stands for Common Vulnerability Exposures which are identified by an industry database that may be subject to change. 302 represents the vulnerability risk score of CVSS 9.3 (CVSS stands for Common Vulnerability Scoring System. The scoring criteria is outlined in FIGS. 4 & 5.

As indicated in the generic flowchart the attack patterns are identified (304) and the system weakness is identified 308 (CWE stands for Common Vulnerability Enumeration) as CWE-20 which is a specific weakness in a list of weaknesses discovered and documented in an industry database. Specific to CWE-20, there are 4524 vulnerabilities (310) classified and may play a role in the threat equation. The method accesses historical (and current if applicable) data to correlate past changes to the application node (312). The method also accesses historical (and current if applicable) data to identify previous changes made to address similar weaknesses (314) such as CWE-20. The method proceeds to list the incidents (316) associated with those changes to address the similar weaknesses (314) and provides that (316) as input in the final computational risk calculations 322. The method also proceeds to identify all the other changes (318) associated with application node #1 along with the previous changes to application node #1 (312) and proceeds to list the incidents (320) associated with the consolidated change risks listed above (318). 320 becomes a second input with 316 and the method uses its internal calculation equations to compute the final risk data.

FIG. 4 illustrates an industry standard for scoring the CVSS; this is criteria for a particular implementation, but potential other versions may be utilized based on the application and standard in question. The content purpose of FIGS. 4 and 5 are strictly to provide some framework for the scoring system that is exercised in FIGS. 6 & 7 within this document. The illustration provides an indication for the reader to understand basis and significance of some variables used in the method scoring. Matrix 402 of relative weights or scores is given for three parameters of a category referred to as Access Vector. Access Vector is one of six categories that will be utilized to compute a CVSS score. The six criteria vectors are identified in FIGS. 4 & 5 and are as follows (402 is an access vector parameter, 404 is a complexity parameter, 406 is an authentication parameter. FIG. 5 illustrates confidentiality parameter (502), 504 reflects integrity parameter and 506 represents the availability parameter. The significance of this chart reflects a foundation of understanding threat levels, for instance, a lower score is given to Local Access value in the Access Vector category (0.395) compared to the score given to the Network Access Value (1.0). The concept is that physical access to a network (Local Access) is more difficult then accessing a system using remote means through a network connection (which can be done most anywhere in the world). The higher the assigned value, the greater the threat—the composite final value of the CVSS score is between 0-10, with 10 being the largest threat. The same concept applies to 404 through 506 in FIG. 5. The final score is categorized within severity levels as shown in 508.

FIG. 6 illustrates an example of status of six categories (604-614) described in FIGS. 4 & 5. As listed, the Confidentiality Impact parameter (604) is identified as "Complete." The value for this parameter that would be used in the final calculations is shown in FIG. 5 as 502. The "Complete" status value is listed as 0.66. The same process is followed for each of the five other parameters and final CVSS score is calculated as 9.3 (302).

Figure 7:
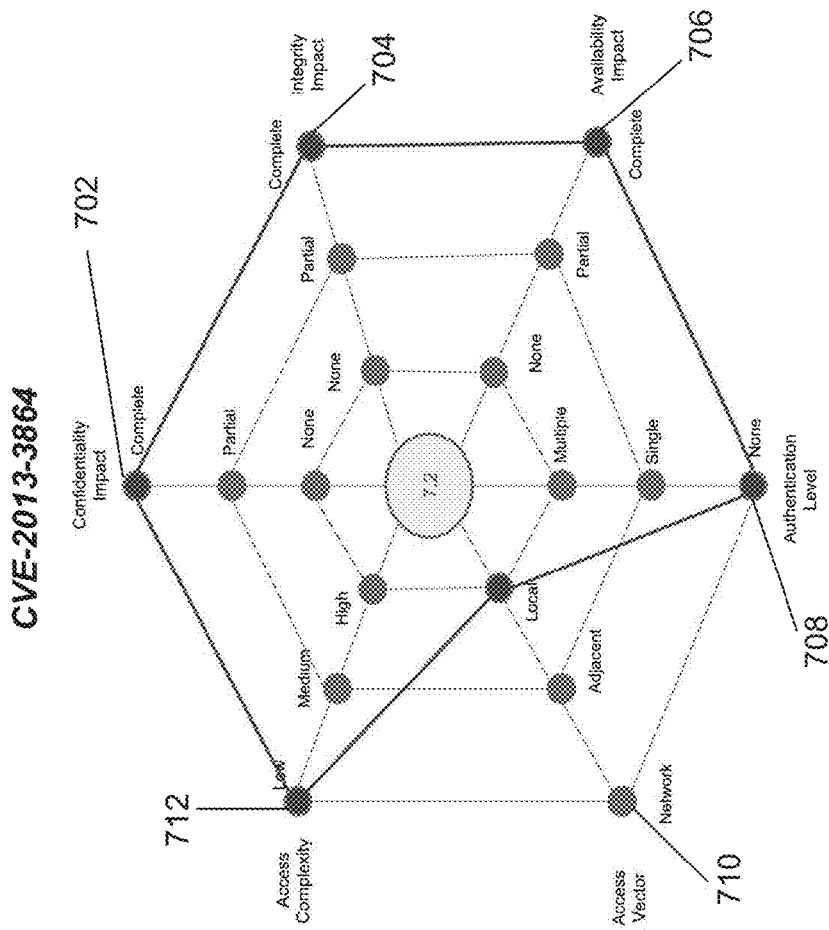
FIG. 7 illustrates an another example evaluation of criteria levels using a spider web vulnerability map and basic vulnerability score based on status of the levels.

FIG. 7 illustrates a similar example as in FIG. 6 but in this case the six categories and each parameter within that category are shown on a spider web map. Basic information about the IT network is also listed as 714. This example depicts different parameters than used in FIG. 6 to produce a different CVVS score result. Each network can have variable scores and the use of historical data married to an intelligent engine can generate a more valuable product for the organization relative to internal and external threats.

Figure 8:
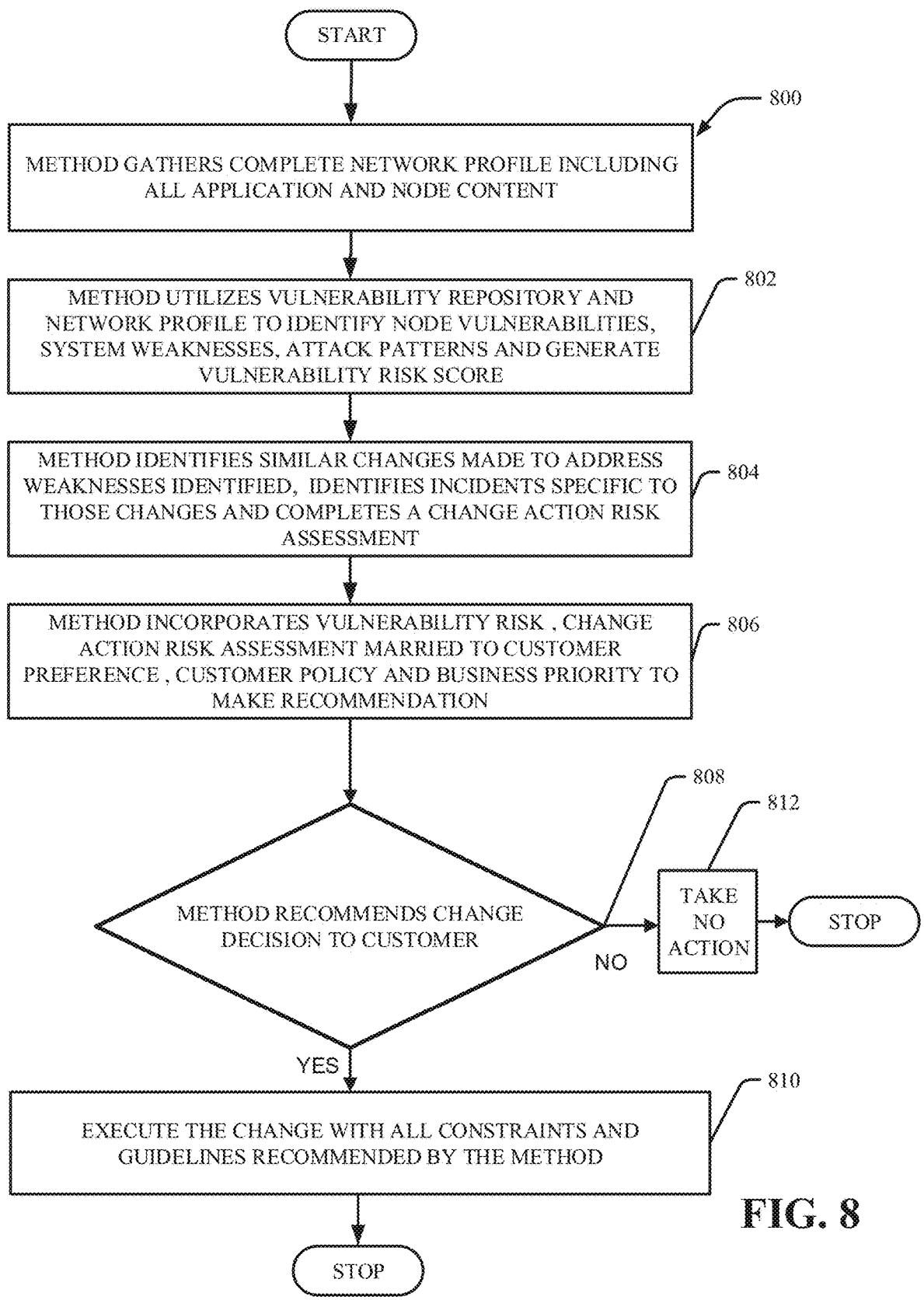
FIG. 8 illustrates a flow chart identifying steps a method takes in generating final recommendations to a customer.

FIG. 8 illustrates a flow chart identifying steps of method in generating final recommendations to a customer. Act 800 depicts initial steps of gathering a network profile including application and node content. Act 802 reflects the following steps of accessing a vulnerability repository and existing network profile data to identify node vulnerability, system weaknesses, attack patterns and generate a vulnerability risk score. Act 804 follows with the method identifying similar changes made to address those weaknesses and identifies incidents that occurred specific to those changes and completes a change action risk assessment. The method (at 806) then takes the information of vulnerability risk, change action risk assessment and incorporates factors such as customer preference, policy and business priorities to generate the optimum plan for the customer. Act 808 reflects the recommendation decision that the method will make to the customer regarding potential change. The method recommends at 810 (proceed with the change) or 812 (take no action as the risk impact of making the change is higher than no action at all.

Figure 9:
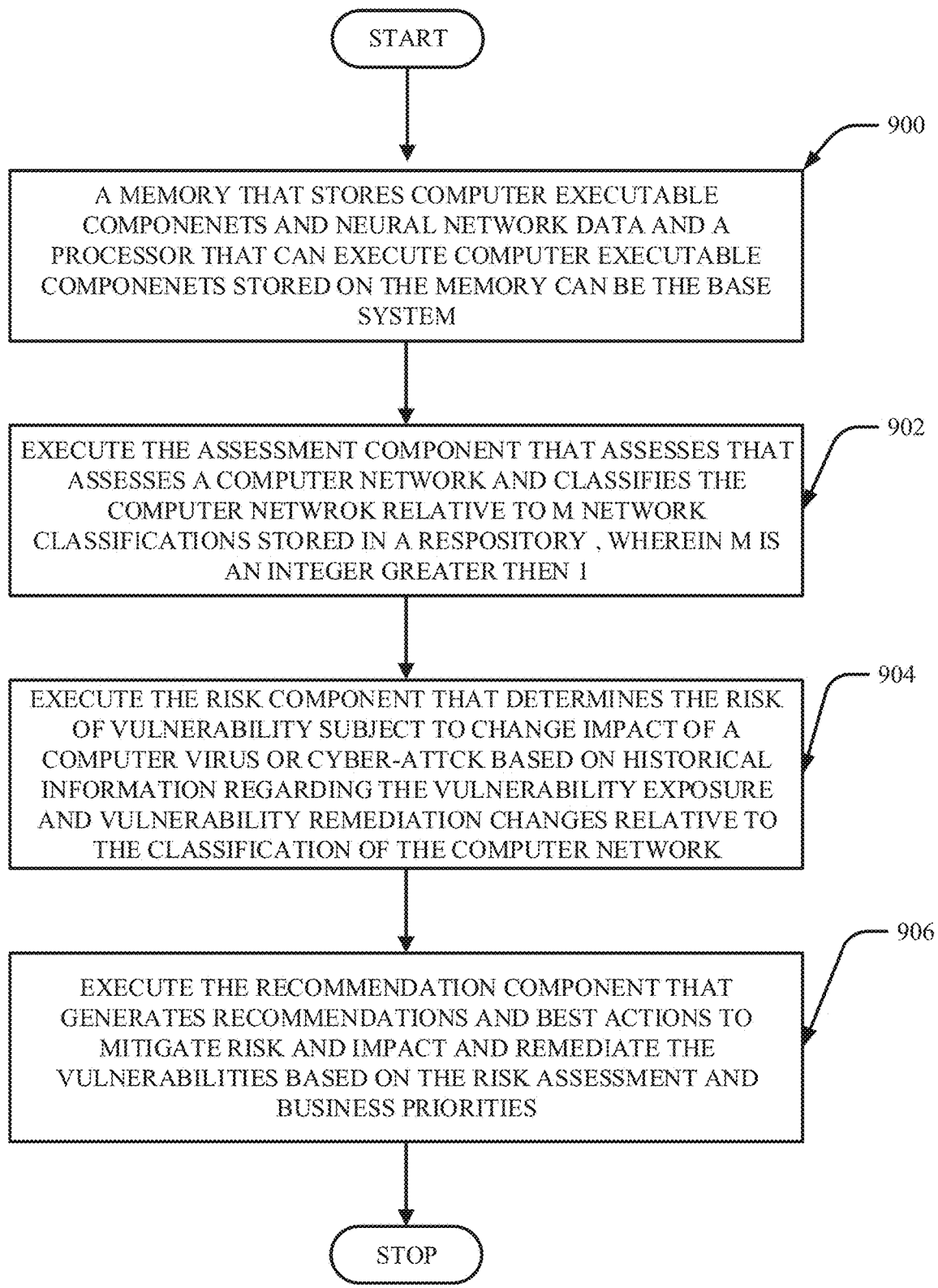
FIG. 9 illustrates a flow chart of a method for generating a final recommendation.

FIG. 9 illustrates a flow chart 900 depicting overview processes of the method in generating the final recommendation. This detailed steps outlined in FIG. 8 would be considered a subset within this overview process. At 902, a computer network is assessed, and classifying the computer network relative to M network classifications stored in a repository, wherein M is an integer greater than one (e.g., using an assessment component 110). At 904, a determination is made (e.g., using risk component 108) regarding risk of vulnerability subject to change impact regarding protecting against a computer virus or cyber-attack based on historical information regarding vulnerability exposure and vulnerability remediation changes relative to the classification of the computer network. At 906, recommendations and best action to mitigate risk and impact, and remediate the vulnerabilities based on the risk assessment and business priorities are generated (e.g., using a recommendation component 112).

Figure 10:
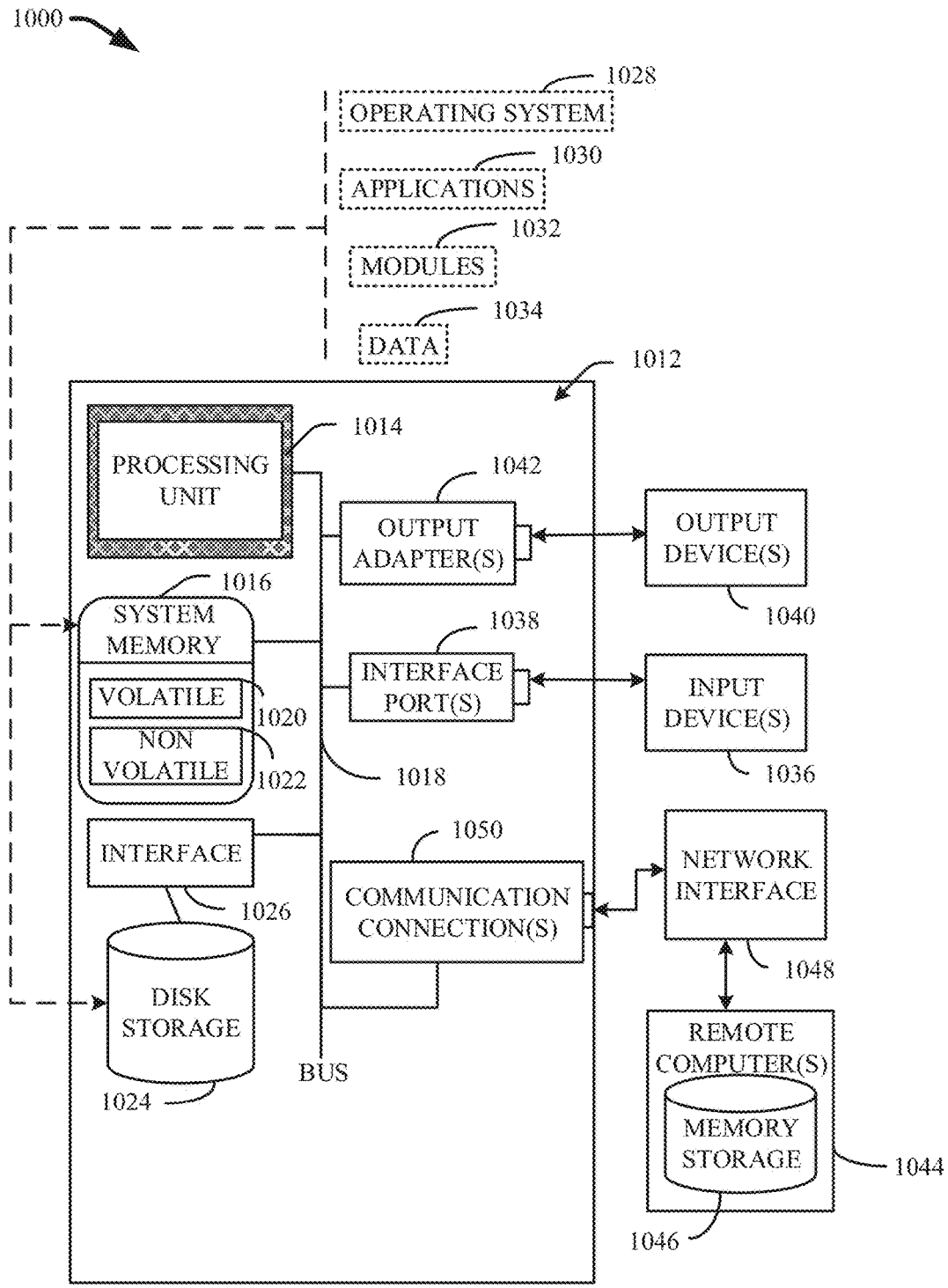
FIG. 10 is a schematic diagram of an example operating environment in accordance with one or more implementations described herein.

To provide context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

A suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1094), and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random-access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/non-volatile computer storage media. FIG. 8 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used, such as interface 1026. FIG. 8 also depicts software that acts as an intermediary between users and the basic computer resources described in the suitable operating environment 1001. Such software can also include, for example, an operating system 1028. Operating system 1028, which can be stored on disk storage 1024, acts to control and allocate resources of the computer 1012. System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Embodiments of the present innovation may be a system, a method, an apparatus and/or a computer program product at any possible technical detail level of integration. The computer program product can include a computer readable storage medium (or media) having computer readable program instructions thereon for causing a processor to carry out aspects of the present innovation. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present innovation can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, to perform aspects of the present innovation.

Aspects of the present innovation are described herein with reference to flowchart illustrations and/or block diagrams of methods, apparatus (systems), and computer program products according to embodiments of the innovation. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present innovation. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform tasks and/or implement abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a server computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products, and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components and neural network data;
a processor that executes computer executable components stored in the memory, wherein the computer executable components comprise:
an assessment component that assesses a computer network, and classifies the computer network relative to M network classifications stored in a repository, wherein M is an integer greater than one;
a risk component that determines risk of vulnerability subject to change impact regarding protecting against a computer virus or cyber-attack based on historical information regarding vulnerability exposure and vulnerability remediation changes relative to the classification of the computer network, wherein the risk component identifies one or more past changes that caused an incident in the historical information based at least on structured documentation; and
a recommendation component that generates recommendations and best action to mitigate risk and impact, and remediate the vulnerabilities based on the risk assessment and business priorities.

2. The system of claim 1, wherein the risk component comprises a predictive model that predicts the risk of a change based on incident history.

3. The system of claim 2, wherein the predictive model comprises at least one of: a logical regression model; a Bayesian network; a neural network; hidden Markov model (HMM); or a support vector machine (SVM).

4. The system of claim 2, wherein the incident history comprises at least one of: category of change; owner group performing changes; similar changes; affected configuration items; or questionnaire answers indicating risk.

5. The system of claim 1, wherein the risk component identifies the one or more past changes that caused the incident through at least one of: scanning incident resolutions, problem records, or root cause analysis data for evidence of a change causing the incident.

6. The system of claim 1, wherein the risk component identifies the one or more past changes that caused the incident through probabilistic linkage of changes and the incident based on a predictive model.

7. The system of claim 4, wherein the risk component identifies similar changes through classifying changes into pre-defined categories.

8. The system of claim 7, wherein a natural language classifier (NLC) is employed in connection with the classification of changes into pre-define categories.

9. The system of claim 4, wherein the risk component identifies similar changes through fine-grained similarity measures factoring cosine-similarity of change request descriptions, configuration items affected, or change owner.

10. The system of claim 1, wherein the risk component identifies current vulnerability of the computer network.

11. A computer-implemented method, comprising employing a processor and memory to execute computer executable components to perform the following acts:
assessing a computer network, and classifying the computer network relative to M network classifications stored in a repository, wherein M is an integer greater than one;
determining risk of vulnerability subject to change impact regarding protection against a computer virus or cyber-attack based on historical information regarding vulnerability exposure and vulnerability remediation changes relative to the classification of the computer network, wherein the determining the risk of vulnerability subject to change impact regarding protection against a computer virus or cyber-attack comprises identifying one or more past changes that caused an incident in the historical information based on at least one of: scanning incident resolutions, problem records, or root cause analysis data for evidence of a change causing the incident; and generating recommendations and best action to mitigate risk and impact, and remediate the vulnerabilities based on the risk assessment and business priorities.

12. The method of claim 11, wherein determining risk comprises using a predictive model that predicts the risk of a change based on incident history.

13. The method of claim 12, wherein the incident history comprises at least one of: category of change; owner group performing changes; similar changes; affected configuration items; or questionnaire answers indicating risk.

14. The method of claim 11, wherein the identifying the one or more changes in the past that caused the incident is further based on structured documentation.

15. The method of claim 11, wherein the identifying the one or more changes in the past that caused the incident is further based on probabilistic linkage of changes and the incident based on a predictive model.

16. The method of claim 11, further comprising identifying current vulnerability of the computer network.

17. A computer program product comprising a computer readable storage medium having program instructions embodied therewith, the program instructions executable by processor to cause the processor to:
   assess a computer network, and classify the computer network relative to M network classifications stored in a repository, wherein M is an integer greater than one;
   determine risk of vulnerability subject to change impact regarding protection against a computer virus or cyber-attack based on historical information regarding vulnerability exposure and vulnerability remediation changes relative to the classification of the computer network, wherein the determination of the risk of vulnerability subject to change impact regarding protection against a computer virus or cyber-attack comprises identification of one or more past changes that caused an incident in the historical information based at least on probabilistic linkage of changes and the incident according to a predictive model; and
   generate recommendations and best action to mitigate risk and impact, and remediate the vulnerabilities based on the risk assessment and business priorities.

18. The computer program product of claim 17, further comprising program instructions executable by processor to cause the processor to determine risk and impact comprises using the predictive model that predicts the risk of a change based on incident history.

19. The computer program product of claim 17, further comprising program instructions executable by processor to cause the processor to identify current vulnerability of the computer network.

20. The computer program product of claim 17, wherein identification of the one or more changes in the past that caused the incident is further based on structured documentation.

21. The computer program product of claim 17, wherein identification of the one or more changes in the past that caused the incident is further based on at least one of: scanning incident resolutions, problem records, or root cause analysis data for evidence of a change causing the incident.

22. The computer program product of claim 17, wherein the predictive model comprises at least one of: a logical regression model; a Bayesian network; a neural network; hidden Markov model (HMM); or a support vector machine (SVM).

23. The computer program product of claim 18, wherein the incident history comprises at least one of: category of change; owner group performing changes; similar changes; affected configuration items; or questionnaire answers indicating risk.

* * * * *